US 6,581,827 B2

(12) United States Patent
Welton (10) Patent No.: US 6,581,827 B2
(45) Date of Patent: Jun. 24, 2003

(54) UNIVERSAL PREPAID TELECOMMUNICATION SERVICES CARD

(75) Inventor: Mark Welton, Great Falls, VA (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/939,519

(22) Filed: Aug. 24, 2001

(65) Prior Publication Data

US 2003/0038175 A1 Feb. 27, 2003

(51) Int. Cl.[7] .............................. G06F 17/00; G06K 5/00
(52) U.S. Cl. ....................... 235/380; 235/375; 235/381
(58) Field of Search ............................... 235/375, 379, 235/380; 705/16, 17, 39, 41, 44

(56) References Cited

U.S. PATENT DOCUMENTS

| | | | | |
|---|---|---|---|---|
| 5,760,381 A | * | 6/1998 | Stich et al. ................... | 235/380 |
| 6,000,608 A | * | 12/1999 | Dorf .......................... | 235/375 |
| 6,032,136 A | * | 2/2000 | Brake, Jr. et al. ............ | 235/380 |
| 6,327,363 B1 | * | 12/2001 | Henderson et al. ..... | 379/265.01 |
| 6,386,457 B1 | * | 5/2002 | Sorie .......................... | 235/487 |
| 2001/0001856 A1 | * | 1/2001 | Gould et al. .................. | 705/39 |
| 2001/0034722 A1 | * | 10/2001 | Tidball et al. .............. | 235/380 |
| 2001/0037209 A1 | * | 11/2001 | Tarbutton et al. .............. | 705/1 |

* cited by examiner

*Primary Examiner*—Michael G. Lee
*Assistant Examiner*—Ahshik Kim
(74) *Attorney, Agent, or Firm*—Townsend and Townsend and Crew LLP (57) ABSTRACT

In a relationship in which a universal prepaid telecommunication services card issuer is different than a telecommunication services provider, a method and system for implementing a universal prepaid telecommunication services card (prepaid card), which can be used as a prepaid card for a plurality of services providers providing one or more telecommunication services. The method comprises a card issuer providing a prepaid card having a identification number associated with the prepaid card. Upon receiving a prepaid card activation request from a card seller or distributor, the card issuer activates the prepaid card. After the card is activated, the card issuer can receive a request to use the card from a user. The card issuer then receives from the user the identification number associated with the prepaid card and validates the identification number. Upon validation of the identification number, the card issuer receives from the user a service request for a particular service provider. The card issuer then communicates the service request to the particular service provider.

28 Claims, 3 Drawing Sheets

UNIVERSAL PREPAID TELECOMMUNICATION SERVICES CARD

BACKGROUND OF THE INVENTION

The present invention relates generally to a prepaid telecommunication services card, and more particularly to a universal prepaid telecommunication services card that can be used for wireless, Internet, local telephone and long distance services for a plurality of service providers. The present invention also relates to systems and methods for implementing the prepaid telecommunication services card.

Prepaid telecommunication services are becoming popular among many people, including immigrants, the credit challenged, teens, seniors, etc. Prepaid services for telecommunication products, such as wireless (cellular, PCS, GSM, etc.), Internet, and traditional telephone services, such as local and long distance telephone services are being offered by many service providers, and typically are provided by issuing prepaid calling or telecommunication cards to customers.

With prepaid telecommunication services currently known in the art, a customer typically purchases a prepaid calling card for the service, and when activated, the service provider credits the customer's account with the amount of the prepaid card. However, because there are a number of service providers, and each of those providers may be offering different services and amounts for each of those services, there are a large number of prepaid cards on the market. For example, companies like Qwest™, AT&T™, Sprint™, Verizon™, and others all may offer wireless, Internet and traditional telephone prepaid services, and each service may be offered with different prepaid amounts ($10, $20, $50, $100, etc.). With such large and diverse product offerings, service providers face difficult production and distribution problems. Moreover, retailers are concerned about carrying products or "SKUs" for each of the service provider's different product offerings. As one skilled in the art will appreciate, if a retailer carries all the different product offerings, the prepaid cards probably would overtake a significant portion of the retailer's shelf space. Accordingly, retailers are hesitant to carry all the different product offerings from the different service providers, so the service providers are finding it difficult to get significant market penetration with their products.

Thus, what is needed is prepaid telecommunication services card system and method that allows a single prepaid card issuer to provide prepaid telecommunication services for multiple service providers.

BRIEF SUMMARY OF THE INVENTION

In a relationship in which a universal prepaid telecommunication services card issuer is different than a telecommunication services provider, a method and system for implementing a universal prepaid telecommunication services card (prepaid card), which can be used as a prepaid card for a plurality of services providers providing one or more telecommunication services. In accordance with one embodiment of a method in accordance with the present invention, a card issuer provides a prepaid card having a identification number associated with the prepaid card. Upon receiving a prepaid card activation request from a card seller or distributor, the card issuer activates the prepaid card. After the card is activated, the card issuer can receive a request to use the card from a user. The card issuer then receives from the user the identification number associated with the prepaid card and validates the identification number. Upon validation of the identification number, the card issuer receives from the user a service request for a particular service provider. The card issuer then communicates the service request to the particular service provider.

In accordance with one embodiment, the identification number for the prepaid card comprises a card serial number, a card personal identification number, or a combination of a serial number and a PIN.

In accordance with another embodiment of the invention, the prepaid card comprises a magnetic strip or microchip for storing information, and the step of the card issuer activating the prepaid card further comprises a POS terminal reading card information from the magnetic strip or the microchip, the POS terminal transmitting the card information to the card issuer, and the card issuer activating the prepaid card based on the received card information.

In accordance with another embodiment of the invention, the prepaid card may have a predefined value assigned to it, or the value can be applied to the card at the time of purchase.

In accordance with another embodiment of the invention a system for implementing the prepaid card.

A more complete understanding of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
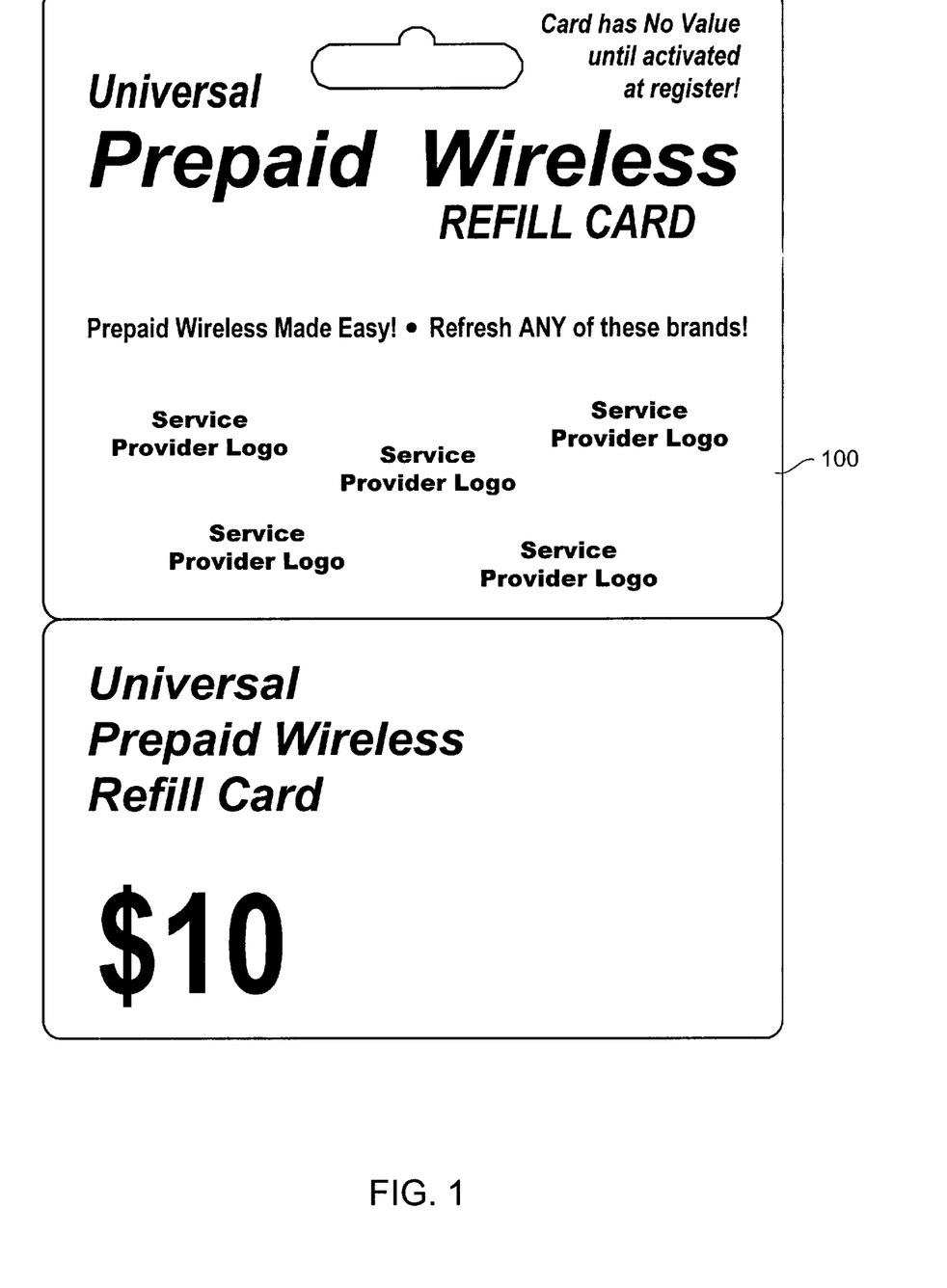
FIG. 1 is a picture of one embodiment of a universal prepaid telecommunication services card.

Rather than each service provider issuing separate prepaid calling cards for each of its service offerings, the present invention proposes use of a single prepaid telecommunication services card 100 ("prepaid card 100") (see FIG. 1), which can be used to replenish telecommunication service accounts from any number of carriers or providers. Thus, the retailer only needs to stock one card rather than separate cards for each carrier and service offering. In one embodiment of the present invention, the value of prepaid card 100 may be assigned at the time of sale. In accordance with another embodiment of the invention, the value of prepaid card 100 is fixed and printed on the card. In the embodiment in which the value of prepaid card 100 is fixed and printed on the card, the retailer may stock one set of cards for each value denomination.

Figure 2:
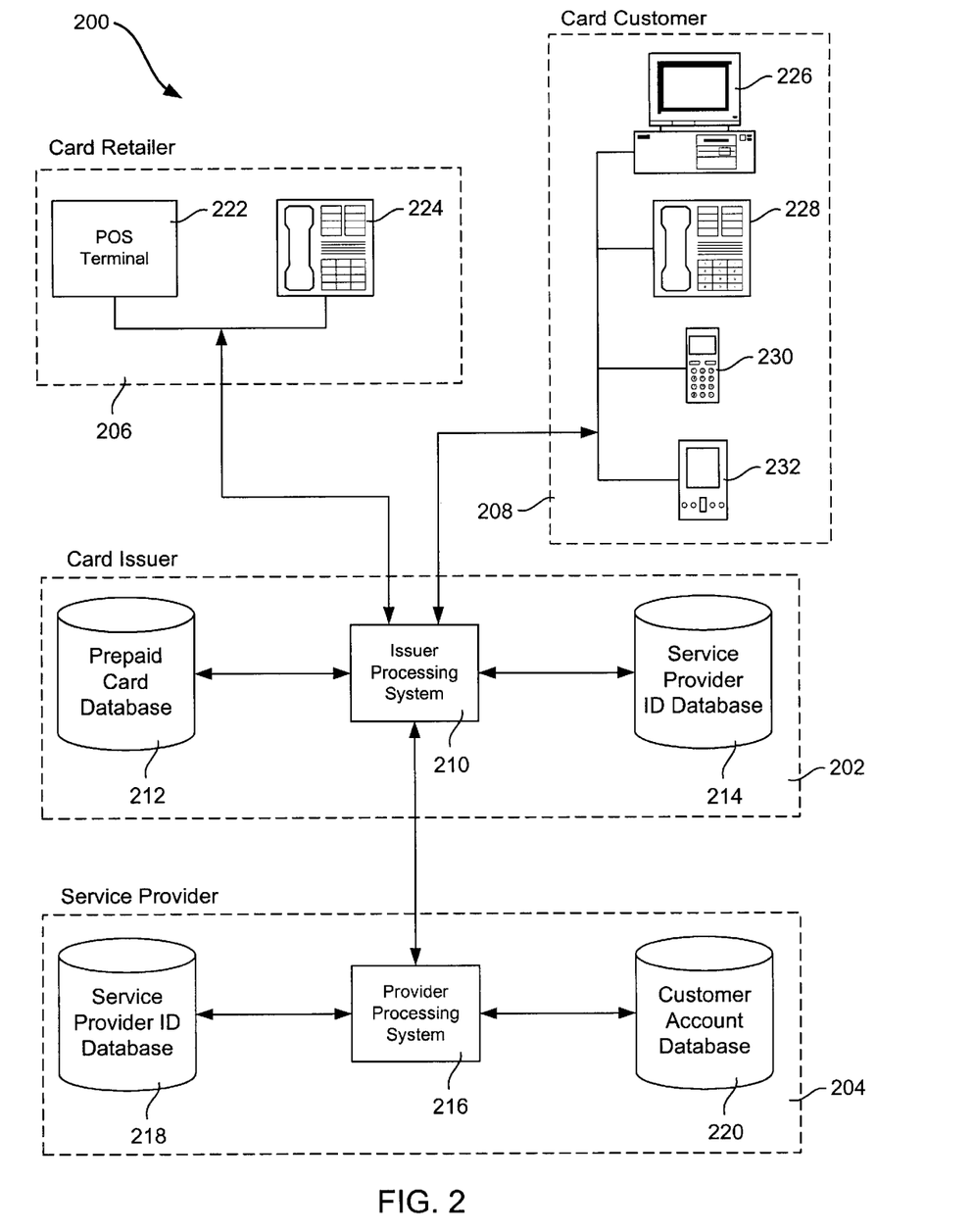
FIG. 2 is a block diagram of one embodiment of a network of systems that can be used to implement a universal prepaid telecommunication services card in accordance with the present invention.

Referring now to FIG. 2, one embodiment of a system and network 200 for implementing a prepaid card in accordance with the present invention is illustrated. In the illustrated embodiment, system 200 comprises a card issuer 202, a service provider 204, a card retailer 206, and a customer 208.

In one embodiment, card issuer 202 is an entity responsible for printing, distributing and implementing prepaid cards 100. Card issuer 202 comprises an issuer processing system 210 for validating and processing prepaid cards 100. Issuer processing system 210 may comprise any suitable processing system, such as a personal computer, a computer server, a mainframe or minicomputer system, or the like. In addition, issuer processing system 210 may comprise an interactive voice response (IVR) unit for processing telephone calls and/or modems, hubs or routers for receiving data from card retailers 206 and/or customers 208. Associated with issuer processing system 210 may be a prepaid card database 212, and a service provider ID database 214. As discussed in more detail below, prepaid card database 212 and service ID provider database 214 are used in the validation and implementation process for prepaid cards 100.

Service provider 204 may be any service provider that provides telecommunication services, such as wireless service, Internet service, local telephone service, long distance telephone service, or any other telecommunication services that may be provided in a prepaid manner. In one embodiment, service provider 204 works with card issuer 202 to provide prepaid telecommunications services. As discussed in more detail below, card issuer 202 issues prepaid cards 100, and when cards 100 are activated, communicates with service provider 204, so that a customer's telecommunication service account is credited. Service provider 204 comprises a provider processing system 216 for communicating with card issuer 202 and for processing prepaid card services. Like with issuer processing system 210, provider processing system 216 may comprise any suitable processing system and may include communications equipment for communicating with card issuer 202, such as IVR systems, modems, hubs, routers, etc. Service provider 204 also may include a prepaid telecommunication services database 218 and a customer account database 220, for processing prepaid telecommunication services requests.

Card retailer 206 may be any entity that sells or distributes prepaid cards 100 to customers. As discussed in more detail below, when a customer purchases a prepaid card 100 from the retailer, the retailer activates the card using a point-of-sale (POS) terminal 222, a telephone 224, or some other communication means (e.g., cell phone, a computer terminal, etc.). As illustrated in FIG. 2, POS terminal 222 and telephone 224 are configured to communicate with issuer processing system 210 at card issuer 202.

Customer 208 may be any individual or entity that purchases a prepaid card 100. In one embodiment, after customer 208 purchases a card, customer 208 communicates with card issuer 202 to activate the card for a particular telecommunication service account of the customer. As discussed in more detail below, this typically requires customer 208 to provide a card serial number and/or a PIN associated with prepaid card 100, as well as customer account information to card issuer 202, and more particularly to issuer processing system 210. To communicate information to issuer processing system 210, customer 208 may use any suitable communication device, such as a computer 226, a telephone 228, a cell phone 230, a personal digital assistant (PDA), or the like.

Figure 3:
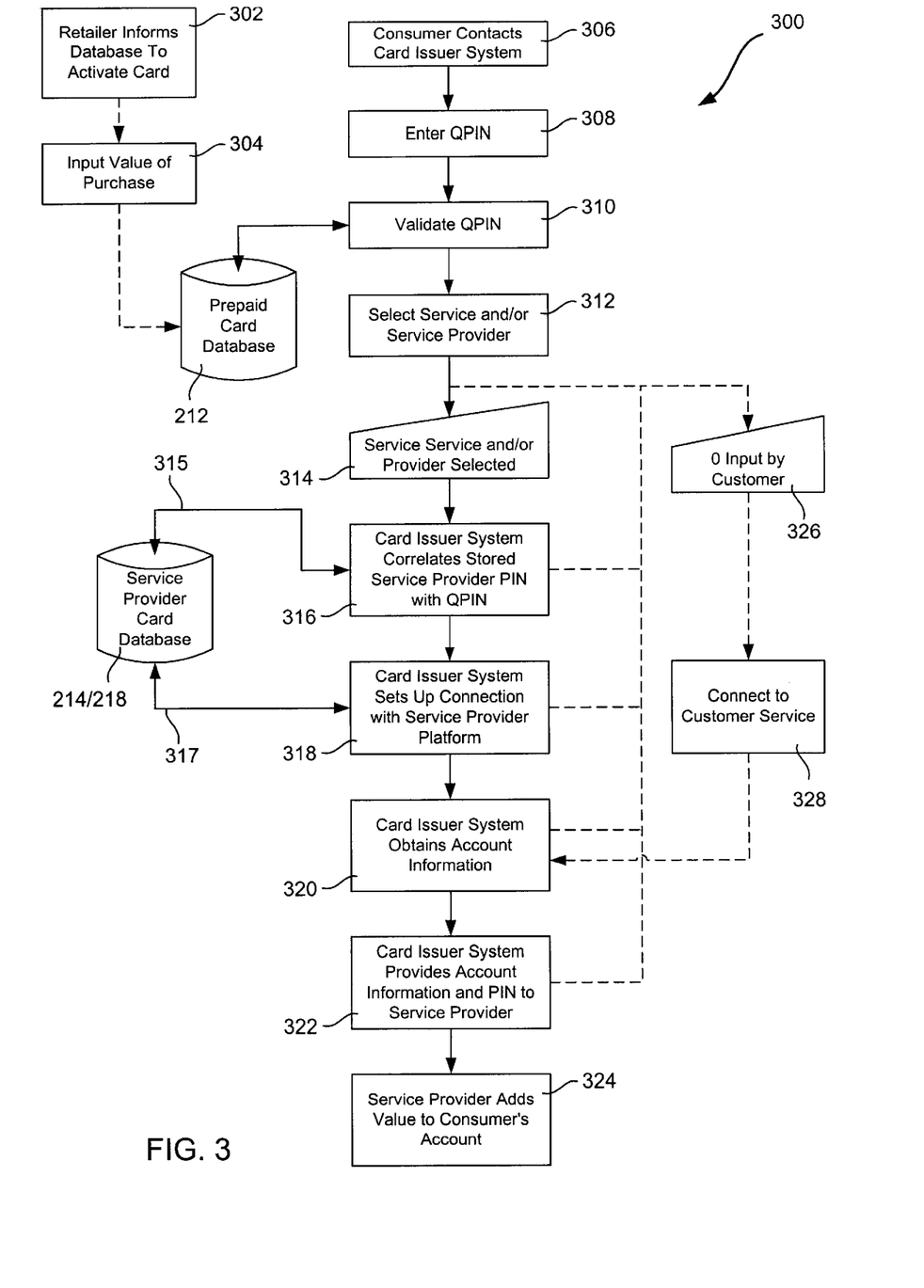
FIG. 3 is a flow chart illustrating one embodiment of a method for implementing the universal prepaid telecommunication services card of the present invention.

Referring now to FIG. 3, a flow chart 300 illustrating one embodiment of a method for implementing a universal prepaid telecommunication services card 100 ("prepaid card 100") is shown. In implementing prepaid telecommunication services cards 100, the cards typically are sold or distributed to customers 208 by card retailers 206, such as grocery stores, convenience stores, gas stations, or other retail outlets. Upon the sale of a prepaid card 100, retailer 206 typically activates prepaid card 100 with card issuer 202. In one embodiment of the invention, each prepaid card 100 has a unique identification or serial number and a PIN assigned to it by card issuer 210. The serial number and PIN for each card are stored at card issuer 202, for example in card database 212. To activate a prepaid card 100, card retailer 206 communicates the card serial number (and perhaps PIN) to issuer processing system 210 at card issuer 202, informing issuer processing system 210 that prepaid card 100 was legitimately sold to a customer (step 302).

In one embodiment, card retailer 206 activates a prepaid card using a POS terminal 222 at the retailer location. For example, prepaid card 100 may include a magnetic strip or microchip, which stores card information, such as card serial number, PIN number, monetary value of the prepaid card, etc. In this embodiment, POS terminal 222 is configured to read the relevant information from the magnetic strip or microchip on the card and transmit that information over a communication link to issuer processing system 210 and database 212. As one skilled in the art will appreciate, the communication link between POS terminal 222 and issuer processing system 210 may be any suitable communication link, such as a telephone line, a direct data connection, a wireless or satellite connection, or the like.

In an alternative embodiment of the invention, prepaid card 100 may not have a specific monetary denomination associated with it. In this embodiment, a customer pays card retailer 206 a monetary amount, and retailer 206 assigns that amount to the card. In one embodiment, to assign an amount to the card, retailer 206 has a POS terminal 222 that writes the amount on the magnetic strip or microchip of the card and/or communicates that amount to issuer processing system 210 and database 212 using the communication link (step 304). In another embodiment, POS terminal 222 merely communicates the amount to issuer processing system 210, but does not write the amount on the card (alternative step 304). The particular procedure used is not important so long as the customer receives the appropriate credit for which he paid.

As one stilled in the art will appreciate, some retail locations may not have POS terminals 222. Thus, in accordance with another embodiment of the invention, card retailer 206 communicates card information to issuer processing system 210 and database 212 using a computer terminal or telephone. In the case where a telephone is used, issuer processing system 210 may include an interactive voice response (IVR) unit or voice recognition unit, which automatically receives the necessary information from the retailer's voice or DTMF responses from the telephone.

When a customer 208 wishes to use prepaid card 100, customer 208 contacts card issuer 202, and more particularly issuer processing system 210 of card issuer 202 (step 306). As discussed above, customer 208 communicates with issuer processing system 210 using any suitable communication device, such as a computer 226, a telephone 228, a cell phone 230, a PDA 232, or the like. If a telephone or cell phone is used, issuer processing system 210 may comprise an IVR or voice recognition unit as discussed above to communicate with customer 208.

After connecting to issuer processing system 210, customer 208 enters a card serial number and PIN associated with prepaid card 100 (step 308). Issuer processing system 210 then validates the information by checking prepaid card database 212 (step 310). In one embodiment, issuer processing system 210 uses the card serial number to extract a record from database 212, and confirm that the entered PIN is valid for the entered card serial number. In addition, issuer processing system 210 validates that prepaid card 100 was activated by a card retailer 206; i.e., that the card was not stolen.

Upon validating the card and PIN, issuer processing system 210 prompts customer 208 to select a service for which it wants to use prepaid card 100, as well as a service provider to provide that service (steps 312–314). For example, customer 208 may select prepaid wireless calling services to be provided by AT&T Wireless™, prepaid Internet services to be provided by MCI Worldcomm™, prepaid local or long distance services to be provided by Qwest Communications™, or any other combination of service and service provider. After customer 208 has selected the service and service provider, issuer processing system 210 obtains a service ID number associated with the service, service provider and/or monetary amount combination. For example, in one embodiment, a service provider such as Qwest Communications™ may have service ID numbers associated with each of its service offerings and monetary value combinations (e.g., wireless $10, wireless $20, long distance $50, local phone service $25, etc.) In an alternative embodiment, service providers may have service ID numbers associated with each service offering (e.g., wireless, Internet, long distance, local phone service, etc.), but no monetary value associated with the service. In this embodiment, card issuer 202 communicates the monetary value of the card to service provider 204 based on the prepaid card set monetary value, or the value assigned to the card by card retailer 206 at the time of purchase. In either case, the service ID numbers are stored in a database.

In one embodiment, service providers 204 may provide the service ID numbers to card issuer 202 to be stored and accessed in service ID database 214 located at the card issuer. In accordance with this embodiment, issuer processing system 210 obtains a service ID number from database 214 (step 316) and then connects to service provider processing system 216 for further processing (step 318). The connection between issuer processing system 210 and database 214 is illustrated in FIG. 3 by line 315.

In accordance with an alternative embodiment of the invention, instead of card issuer 202 storing the service provider's service ID numbers locally (e.g., in database 214), card issuer 202 may be configured to access the service ID numbers stored at service provider 204, for example in service provider ID database 218 (illustrated as step 318). In accordance with this aspect of the present invention, issuer processing system 210 accesses database 218, for example through the provider processing system 216. The connection between issuer processing system 210 and database 218 is illustrated in FIG. 3 by line 317. If this particular embodiment is used, the connection between card issuer 202 and service provider 204 can be maintained for further processing (step 318).

As one skilled in the art will appreciate, to use a prepaid card for any given service, a customer typically has an account with a service provider for a particular service or establishes an account prior to using the prepaid card. For example, for wireless service, a customer needs a wireless phone (cellular, PCS, GSM, etc.) to make calls. Typically, the customer will purchase or be given a phone for use with one or more service providers. At the time the customer receives the phone, the customer typically establishes an account with the one or more service providers with which the phone can be used. The same also holds true for other telecommunication services. Internet, local phone, and long distance service providers all require customers to establish accounts before they will provide service. In one embodiment, a customer establishes an account with a service provider by contacting the service provider directly. In another embodiment, the system of the present invention can be used to assist a customer in establishing an account with a service provider for a particular service.

If a customer 208 has an established account for the service/service provider selected in step 312, customer 208 is prompted to enter additional information, such as customer account information (step 320). In one embodiment, issuer processing system 210 at card issuer 202 prompts customer 208 to enter the information, and then passes the information on to provider processing system 216 at service provider 204. In accordance with this embodiment, issuer processing system 210 receives account information from customer 208, establishes a connection with service provider 204, and then passes the account information to service provider 204, along with the service ID associated with the selected service, service provider and monetary amount (step 322). Upon receiving the account and service ID information from card issuer 202, provider processing system 216 validates the information by accessing service provider ID database 218 and customer account database 220. If the customer account and service ID information is valid, provider processing system 216 at service provider 204 credits the customer's service account with the monetary value of prepaid card 100 purchased by the customer. Provider processing system 216 then informs issuer processing system 210 at card issuer 202 that the customer's account was credited. Issuer processing system 210, in turn, notifies the customer.

In accordance with another embodiment of the invention, instead of issuer processing system 210 at card issuer 202 connecting to provider processing system 216 after it obtains the customer's account information, issuer processing system 210 may connect to provider processing system 216 before customer account information is obtained. In accordance with this embodiment of the invention, issuer processing system 210 immediately may pass account information from the customer to service provider 204. For example, issuer processing system 210 may receive account information and send it directly to service provider 204, or issuer processing system 210 may establish a 3-way call with provider processing system 216 at service provider 204 and the customer. With a 3-way call, either issuer processing system 210 or provider processing system 216 may be configured to prompt the customer to enter account information. In either case, the account information, along with the service ID is passed to provider processing system 216 for processing as discussed above. As one skilled in the art will appreciate, the specific configuration and method by which account and service ID information is passed from card issuer 202 to service provider 204 is not important, so long as the information arrives at the service provider, is validated, and the customer account is credited.

If a customer purchases a prepaid card 100, but does not have an account established with a service provider, the customer is informed of that fact when service provider 204 attempts to validate the customer account information. If this occurs, the customer is instructed to set-up an account by contacting the service provider directly or by working through a customer service agent at card issuer 202.

Alternatively, issuer processing system 210 may be configured to establish service provider accounts, or issuer processing system 210 may connect the customer to provider processing system 216, so that it can establish the account. The particular process of how an account is established is not important. Once the account is established, however, the customer can use the system of the present invention to implement the prepaid card.

As illustrated in FIG. 3., if at any step during the prepaid card validation process, a customer has a problem or would like to speak with a customer service agent, the customer can press a predetermined key (such as 0) (step 326) and the customer is transferred to a customer service agent (step 328). In addition, all other IVR and computing system functionality may be incorporated into the system of the present invention.

In conclusion, the present invention provides novel system and method for obtaining dimensional measurements of live animals and/or carcasses. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. In a relationship where a universal prepaid telecommunication services card issuer is a different entity than a telecommunication services provider, a method for implementing a universal prepaid telecommunication services card (prepaid card), which can be used as a prepaid card for a plurality of services providers providing one or more telecommunication services, comprising:

a card issuer providing a prepaid card having an identification number associated with the prepaid card;

the card issuer activating the prepaid card upon receipt of an activation request from a prepaid card seller;

the card issuer receiving a request from a user to use the prepaid card;

the card issuer receiving from the user the identification number associated with the prepaid card and validating the identification number;

upon validation of the identification number, the card issuer receiving from the user a service request for a particular service provider; and the card issuer communicating the service request to the particular service provider.

2. The method as recited in claim 1, wherein the identification number comprises a card serial number, a card personal identification number (PIN), or a combination of a serial number and a PIN.

3. The method as recited in claim 1, wherein the prepaid card comprises a magnetic strip or a microchip, and wherein the step of the card issuer activating the prepaid card further comprises:

a POS terminal reading card information from the magnetic strip or the microchip;

the POS terminal transmitting the card information to the card issuer; and the card issuer activating the prepaid card based on the received card information.

4. The method as recited in claim 1, wherein the step of the card issuer activating the prepaid card further comprises:

the card seller calling the card issuer and communicating card information to the card issuer; and the card issuer activating the prepaid card based on the received card information.

5. The method as recited in claim 1, wherein the step of the card issuer receiving a request from a user to use the prepaid card further comprises:

the user contacting the card issuer using a telephone, a wireless phone, a computer, or a personal digital assistant.

6. The method as recited in claim 1, wherein the step of the card issuer validating the identification number further comprises:

validating that the prepaid card was activated; and validating that the identification number is valid.

7. The method as recited in claim 1, wherein the step of the card issuer receiving a service request for a particular service provider further comprises:

receiving from the user a service for which the prepaid card will be used; and receiving from the user a service provider that is to provide the service.

8. The method as recited in claim 1, wherein the step of the card issuer communicating the service request to the particular service provider further comprises:

the card issuer obtaining a service ID number associated with the selected service and service provider;

the card issuer obtaining user account information from the user; and the card issuer communicating the user account information and the service ID number to the selected service provider.

9. The method as recited in claim 1, wherein the step of the card issuer communicating the service request to the particular service provider further comprises:

the card issuer obtaining a service ID number associated with the selected service and service provider;

the card issuer connecting to the selected service provider; and the card issuer obtaining user account information from the user and communicating the user account information and the service ID number to the selected service provider.

10. The method as recited in claim 1, wherein the step of the card issuer communicating the service request to the particular service provider further comprises:

the card issuer obtaining a service ID number associated with the selected service and service provider;

the card issuer connecting to the selected service provider;

the service provider obtaining user account information from the user through the connection with the card issuer; and the service provider obtaining the service ID number from the card issuer.

11. The method as recited in claim 8, further comprising:

the service provider validating and processing the service request by:

the service provider validating that the service ID number and the user account information; and the service provider crediting the user's account with a value of the prepaid card.

12. The method as recited in claim 1, wherein the step of a card issuer providing a prepaid card comprises the card issuer providing a prepaid card having a predetermined value associated therewith.

13. The method as recited in claim 1, wherein the step of a card issuer providing a prepaid card comprises the card issuer providing a prepaid card with no value associated therewith, and wherein the method comprises:
the card seller assigning a value to the prepaid card when the card seller sells the prepaid card to the user.

14. In a relationship where a universal prepaid telecommunication services card issuer is a different entity than a telecommunication services provider, a system for implementing a universal prepaid telecommunication services card (prepaid card), which can be used as a prepaid card for a plurality of services providers providing one or more telecommunication services, comprising:
a processing system having one or more data communication devices in communication with it; and
a prepaid card identification database in communication with the processing system;
wherein upon the sale or distribution of a prepaid card:
the processing system receives a prepaid card activation request from a card seller via the one or more data communications devices, and the processing system activates the prepaid card by interfacing with the prepaid card identification database;
the processing system receives a request from a user to use the prepaid card via the one or more communication devices;
the processing system, through the one or more communication devices, obtains a prepaid card identification number associated with the prepaid card and validates the identification number;
upon validation of the identification number, the processing system obtains from the user a service request for a particular service provider; and
using the one or more communication devices, the processing system communicates the service request to the particular service providers.

15. In a relationship where a universal prepaid telecommunication services card issuer is a different entity than a telecommunication services provider, a prepaid telecommunication services card (prepaid card) that can be used to purchase a prepaid service from at least one of a plurality of services providers by requesting the prepaid service from the card issuer, wherein each of the plurality of services providers provides one or more telecommunication services.

16. The system as recited in claim 14, wherein the prepaid card identification number comprises a card serial number, a card personal identification number (PIN), or a combination of a serial number and a PIN.

17. The system as recited in claim 14, wherein the one or more data communication devices comprises a point-of-sale (POS) terminal configured to read card information from a magnetic strip, bar code or microchip on the prepaid card.

18. The system as recited in claim 14, wherein the processing system validates the identification number by interfacing with the prepaid card identification database to determine if the prepaid card was activated and to determine if the identification number is valid.

19. The system as recited in claim 14, wherein the service request for a particular service provider comprises a request for a service type for which the prepaid card will be used and a request for a service provider that is to provide the service.

20. The system as recited in claim 19, wherein the request for a service type comprises a request from a list of service types comprising wireless telecommunication services, long distance telecommunication services, local telecommunication services, cable telecommunication services, and Internet services.

21. The system as recited in claim 14, wherein the prepaid card includes a predetermined service associated with it, and wherein the service request for a particular service provider comprises a request for a service provider tat is to provide the service.

22. The system as recited in claim 21, wherein the predetermined service comprises a service from a list of services comprising wireless telecommunication services, long distance telecommunication services, local telecommunication services, cable telecommunication services, and Internet services.

23. The system as recited in claim 14, wherein the processing system communicates the service request to the particular service provider by:
the processing system obtaining a service ID number associated with the selected service and service provider;
the processing system obtaining user account information from the user; and
the processing system communicating the user account information and the service ID number to the selected service provider.

24. The system as recited in claim 14, wherein the processing system communicates the service request to the particular service provider by:
the processing system obtaining a service ID number associated with the selected service and service provider;
the processing system connecting to the selected service provider;
the processing system obtaining user account information from the user and communicating the user account information and the service ID number to the selected service provider.

25. The system as recited in claim 14, wherein the processing system communicates the service request to the particular service provider by:
the processing system obtaining a service ID number associated with the selected service and service provider;
the processing system connecting to the selected service provider;
the service provider obtaining user account information from the user trough a communication connection with the processing system.

26. The system as recited in claim 14, wherein the prepaid card as a predetermined value associated therewith.

27. The system as recited in claim 14, wherein the prepaid card as no value associated therewith, and wherein a card seller assigns a value to the prepaid card when the card sellers sells the prepaid card to the user and transmits the value to the processing system using the one or more data communication connections.

28. In a relationship where a universal prepaid telecommunication services card issuer is a different entity than a telecommunication services provider, a method for implementing a universal prepaid telecommunication services card (prepaid card), which can be used as a prep aid card for a plurality of service providers providing one or more telecommunication services, comprising:
a card issuer providing a prepaid card having an identification number associated with the prepaid card;
the card issuer activating the prepaid card upon receipt of an activation request from a prepaid card seller;
the card issuer receiving a request from a user to use the prepaid card;
the card issuer receiving from the user the identification number associated with the prepaid card and validating the identification number;

upon validation of the identification number, receiving from the user a service request for a particular service provider; and the card issuer providing to the user a service provider identification number and contact information for the particular service provider, whereby the user used the contact information and service provider identification number to contact the service provider and receive account credit associated with the prepaid card.

* * * * *

UNITED STATES PATENT AND TRADEMARK OFFICE
CERTIFICATE OF CORRECTION

PATENT NO. : 6,581,827 B2
DATED : June 24, 2003
INVENTOR(S) : Mark Welton

It is certified that error appears in the above-identified patent and that said Letters Patent is hereby corrected as shown below:

Column 7,
Lines 17-19, "In conclusion, the present invention provides novel system and method for obtaining dimensional measurements of live animals and/or carcasses." should read -- In conclusion, the present invention provides a novel method and system for implementing a universal prepaid telecommunication services card. --.

Column 10,
Line 2, "tat" should read -- that --.
Lines 45 and 47, "as" should read -- has --.
Line 56, "prep aid" should read -- prepaid --.

Column 11,
Line 6, "used" should read -- uses --.

Signed and Sealed this

Seventh Day of October, 2003

JAMES E. ROGAN
*Director of the United States Patent and Trademark Office*